United States Patent
Kuo et al.

(10) Patent No.: US 11,490,737 B2
(45) Date of Patent: Nov. 8, 2022

(54) COMPUTER COCKPIT AND ADJUSTING METHOD THEREOF

(71) Applicant: Acer Incorporated, New Taipei (TW)

(72) Inventors: Yan-Lin Kuo, New Taipei (TW); Hsueh-Chih Peng, New Taipei (TW)

(73) Assignee: Acer Incorporated, New Taipei (TW)

( * ) Notice: Subject to any disclaimer, the term of this patent is extended or adjusted under 35 U.S.C. 154(b) by 800 days.

(21) Appl. No.: 16/431,754

(22) Filed: Jun. 5, 2019

(65) Prior Publication Data
US 2020/0260878 A1 Aug. 20, 2020

(30) Foreign Application Priority Data

Feb. 16, 2019 (TW) ................................. 108105221

(51) Int. Cl.
*A47C 31/12* (2006.01)
*A47C 7/72* (2006.01)
(Continued)

(52) U.S. Cl.
CPC ................ *A47C 7/723* (2018.08); *A47C 1/00* (2013.01); *A47C 3/18* (2013.01); *A47C 31/126* (2013.01);
(Continued)

(58) Field of Classification Search
CPC .................. A47C 31/126; A47C 7/723; B60N 2002/0268; B60N 2002/0272; A63F 13/25; A63F 13/28
See application file for complete search history.

(56) References Cited

U.S. PATENT DOCUMENTS

| | | | | |
|---|---|---|---|---|
| 2010/0066132 A1* | 3/2010 | Tal Marchand | ....... | A47C 1/037 297/170 |
| 2010/0201165 A1* | 8/2010 | Dankovich | .............. | A47C 1/03 248/398 |

(Continued)

FOREIGN PATENT DOCUMENTS

| | | | |
|---|---|---|---|
| CN | 102582473 | | 7/2012 |
| CN | 110089870 A | * | 8/2019 |

(Continued)

OTHER PUBLICATIONS

"Office Action of Taiwan Counterpart Application", dated May 7, 2019, pp. 1-14.

*Primary Examiner* — Timothy J Brindley
(74) *Attorney, Agent, or Firm* — JCIPRNET

(57) ABSTRACT

A computer cockpit including a cockpit body, a driving module, a sensing module and a controlling module. The cockpit body includes a seat, a backrest and a display interface all movably disposed on the cockpit body. The display interface and the backrest are respectively located at two opposite sides of the seat. The driving module and the sensing module are disposed to the cockpit body, and the sensing module is configured to provide sensing data. The sensing data includes a seat pressure sensing value and a backrest pressure sensing value. The controlling module is electrically connected to the driving module and the sensing module, and configured to send an adjusting command according to the sensing data. The driving module is configured to receive the adjusting command to synchronously rotate the seat, the backrest and the display interface to a working angle and reduce a difference between the backrest pressure sensing value and the seat pressure sensing value.

19 Claims, 8 Drawing Sheets

(51) Int. Cl.
*A63F 13/25* (2014.01)
*A47C 1/00* (2006.01)
*G05B 15/02* (2006.01)
*G05D 3/20* (2006.01)
*A47C 3/18* (2006.01)

(52) U.S. Cl.
CPC .............. *A63F 13/25* (2014.09); *G05B 15/02* (2013.01); *G05D 3/20* (2013.01)

(56) References Cited

U.S. PATENT DOCUMENTS

| | | | |
|---|---|---|---|
| 2014/0265460 A1* | 9/2014 | Voigt | A47C 7/006 297/170 |
| 2015/0366350 A1 | 12/2015 | Di Censo et al. | |
| 2016/0195923 A1* | 7/2016 | Nauseef | G06F 3/012 297/344.21 |
| 2018/0352959 A1* | 12/2018 | Zhang | A47C 1/03 |
| 2020/0147484 A1* | 5/2020 | Hou | A63F 13/40 |

FOREIGN PATENT DOCUMENTS

| | | | | |
|---|---|---|---|---|
| KR | 20200100308 A | * | 8/2020 | |
| TW | 201607463 | | 3/2016 | |
| WO | WO-2011016707 A2 | * | 2/2011 | ........... A47C 1/0355 |
| WO | WO-2012057639 A1 | * | 5/2012 | ........... A47B 83/001 |
| WO | WO-2012153920 A2 | * | 11/2012 | ............... A47C 7/68 |
| WO | WO-2015000149 A1 | * | 1/2015 | ........... A47C 15/004 |
| WO | WO-2021247941 A1 | * | 12/2021 | ............... A47C 3/24 |

\* cited by examiner

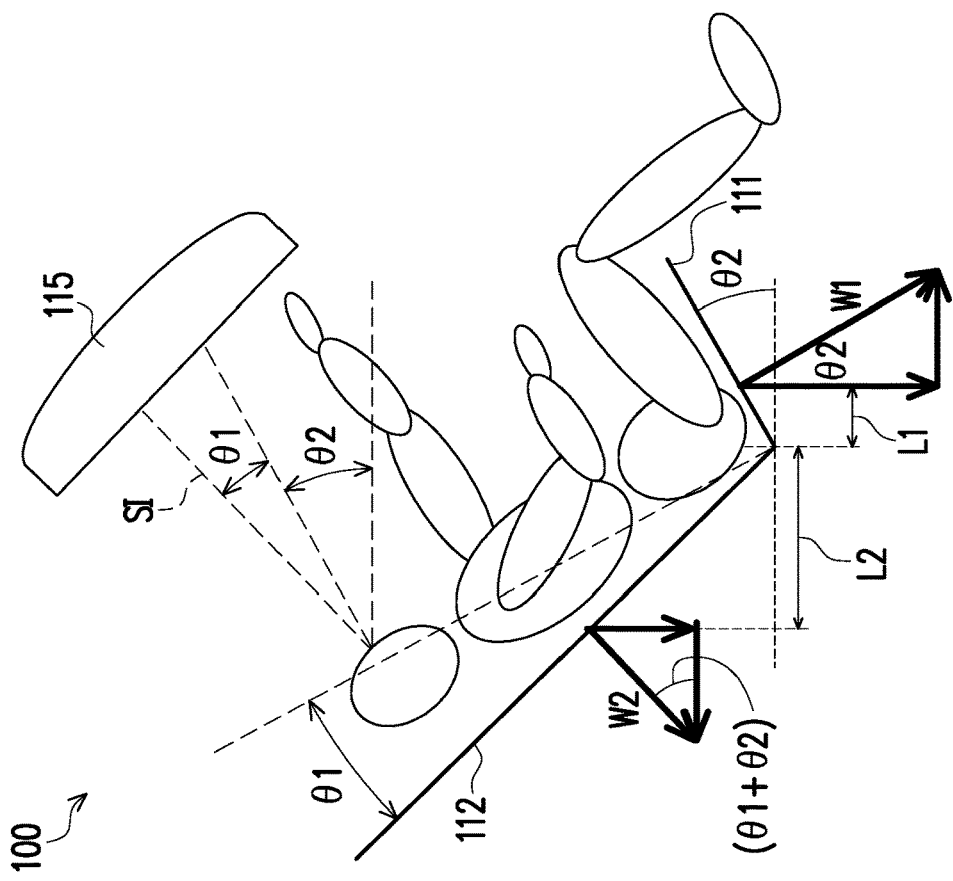
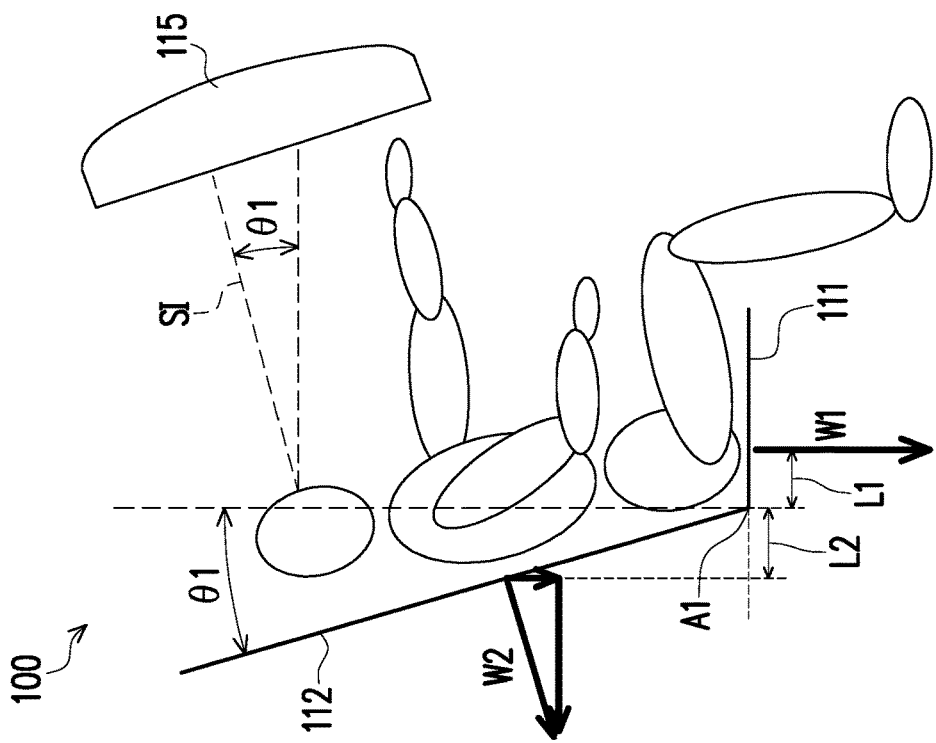
FIG. 3A
FIG. 3B

COMPUTER COCKPIT AND ADJUSTING METHOD THEREOF

CROSS-REFERENCE TO RELATED APPLICATION

This application claims the priority benefit of Taiwan application serial no. 108105221, filed on Feb. 16, 2019. The entirety of the above-mentioned patent application is hereby incorporated by reference herein and made a part of this specification.

BACKGROUND

Technical Field

The invention relates to a computer cockpit, and particularly relates to a computer cockpit and an adjusting method thereof.

Description of Related Art

Along with the rise of the e-sports industry, more and more products are accordingly developed, and in order to create a more comfortable environment for e-sports players, vendors have developed computer cockpits. The computer cockpits provide users with higher level of comfort and may meet the needs of the users sitting in the computer cockpit for a long time, thus providing the users with a higher level of enjoyment. However, in the existing computer cockpits, it is unable to adjust reclining angles of a seat, a backrest and a display interface according to the needs of different users. In other words, reclining angles of the seat, the backrest and the display interface are lack of an ergonomic automatic adjustment mechanism, resulting in poor comfort of the computer cockpits.

SUMMARY

The invention is directed to a computer cockpit and an adjusting method thereof, which are adapted to automatically adjusting reclining angles of a seat, a backrest and a display interface to meet with ergonomics, which avails improving comfortness of a user using the computer cockpit.

The invention provides a computer cockpit including a cockpit body, a driving module, a sensing module and a controlling module. The cockpit body includes a seat, a backrest and a display interface. The seat, the backrest and the display interface are movably disposed on the cockpit body. The display interface and the backrest are respectively located at two opposite sides of the seat. The driving module is disposed to the cockpit body. The sensing module is disposed to the cockpit body, and is configured to provide sensing data. The sensing data includes a seat pressure sensing value and a backrest pressure sensing value. The controlling module is electrically connected to the driving module and the sensing module, and is configured to send an adjusting command according to the sensing data. The driving module is configured to receive the adjusting command to rotate the seat, the backrest and the display interface to a working angle and reduce a difference between the backrest pressure sensing value and the seat pressure sensing value.

The invention provides a computer cockpit adjusting method for adjusting the aforementioned computer cockpit. The computer cockpit adjusting method includes: providing the sensing data by the sensing module, wherein the sensing data includes the seat pressure sensing value and the backrest pressure sensing value; determining whether the sensing data exceeds a predetermined value by the controlling module; sending the adjusting command by the controlling module, wherein when the controlling module determines that the sensing data exceeds the predetermined value, the controlling module sends the adjusting command; and receiving the adjusting command by the driving module to synchronously rotate the seat, the backrest and the display interface to the working angle from a default angle.

In an embodiment of the invention, the seat and the backrest are pivotally connected to the cockpit body by an axis, and when the seat, the backrest and the display interface are in the working angle, a following equation is satisfied: $W_2 \sin(\theta_1+\theta_2)L_2 = W_1 \cos(\theta_2)L_1$, wherein $W_1$ is a first pressure exerted to the seat, $W_2$ is a second pressure exerted to the backrest, $\theta_1$ is an initial angle of the backrest, $\theta_2$ is the working angle, $L_1$ is a first horizontal distance between a force acting position of the first pressure and the axis, and $L_2$ is a second horizontal distance between a force acting position of the second pressure and the axis.

In an embodiment of the invention, the sensing module includes a seat pressure sensor, which is disposed to the seat and electrically connected to the controlling module, and is configured to sense a pressure exerted on the seat and correspondingly generate the seat pressure sensing value.

In an embodiment of the invention, the sensing module includes a backrest pressure sensor, which is disposed to the backrest and electrically connected to the controlling module, and is configured to sense a pressure exerted on the backrest and correspondingly generate the backrest pressure sensing value.

In an embodiment of the invention, the cockpit body further includes a headrest connected to the backrest. The sensing data further includes a headrest pressure sensing value. The sensing module includes a headrest pressure sensor, which is disposed to the headrest and electrically connected to the controlling module, and is configured to sense a pressure exerted on the headrest and correspondingly generate the headrest pressure sensing value.

In an embodiment of the invention, the sensing data further includes a human body position sensing value. The sensing module includes a human body infrared sensor, which is disposed to the cockpit body and electrically connected to the controlling module, and is configured to sense whether a user sits on the seat and correspondingly generate the human body position sensing value.

In an embodiment of the invention, the cockpit body further includes a headrest connected to the backrest. The sensing data further includes a head position sensing value and/or an eye position sensing value. The sensing module includes a head infrared sensor, which is disposed to the cockpit body and electrically connected to the controlling module, and is configured to sense whether a head of a user is located in front of the headrest and correspondingly generate the head position sensing value, and/or configured to sense a position of eyes of the user and correspondingly generate the eye position sensing value.

In an embodiment of the invention, the adjusting command includes a working angle adjusting command. The driving module includes a posture adjusting driver, which is disposed to the cockpit body, and is coupled to the seat and the backrest and electrically connected to the controlling module, and is configured to receive the working angle adjusting command to synchronously rotate the seat, the backrest and the display interface to the working angle.

In an embodiment of the invention, the controlling module includes a storing unit and a microcontroller unit. The storing unit is configured to store a compared table. The microcontroller unit is electrically connected to the driving module, the sensing module and the storing unit, and is configured to send the adjusting command according to the sensing data and the compared table.

In an embodiment of the invention, the backrest and the display interface are rotatably connected to the seat, and the backrest and the display interface have an initial angle relative to the seat, and the compared table includes the difference, the initial angle and the working angle corresponding to the difference and the initial angle.

In an embodiment of the invention, the display interface is rotatably disposed on the cockpit body. The adjusting command includes a display interface rotating command. The driving module includes a display interface rotating driver, which is disposed to the cockpit body and coupled to the display interface and electrically connected to the controlling module, and is configured to receive the display interface rotating command to rotate the display interface to face the backrest.

In an embodiment of the invention, the display interface is slidably disposed on the cockpit body. The adjusting command includes a display interface sliding command. The driving module includes a display interface sliding driver, which is disposed to the cockpit body and coupled to the display interface and electrically connected to the controlling module, and is configured to receive the display interface sliding command to adjust a height of the display interface.

In an embodiment of the invention, the backrest is rotatably disposed on the cockpit body. The adjusting command includes a backrest rotating command. The driving module includes a backrest rotating driver, which is disposed to the cockpit body and coupled to the backrest and electrically connected to the controlling module, and is configured to receive the backrest rotating command to rotate the backrest and the seat to face the display interface.

In an embodiment of the invention, the display interface includes a projecting screen. The computer cockpit further includes a projector disposed on top of the cockpit body, and the projecting screen and the projector are respectively located at the two opposite sides of the seat.

Based on the above description, in the computer cockpit and the adjusting method thereof of the invention, the sensing module is disposed to the cockpit body, and is configured to provide the sensing data. The sensing data include the seat pressure sensing value and the backrest pressure sensing value. The controlling module is electrically connected to the driving module and the sensing module, and is configured to send the adjusting command according to the sensing data. The driving module is configured to receive the adjusting command to rotate the seat, the backrest and the display interface to the working angle and reduce the difference between the backrest pressure sensing value and the seat pressure sensing value. In this way, the angles of the seat, the backrest and the display interface may be automatically adjusted to meet ergonomics, which avails improving comfortness of the user using the computer cockpit.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B illustrate an operation principle of the computer cockpit of FIG. 1.

DESCRIPTION OF THE EMBODIMENTS

Figure 1:
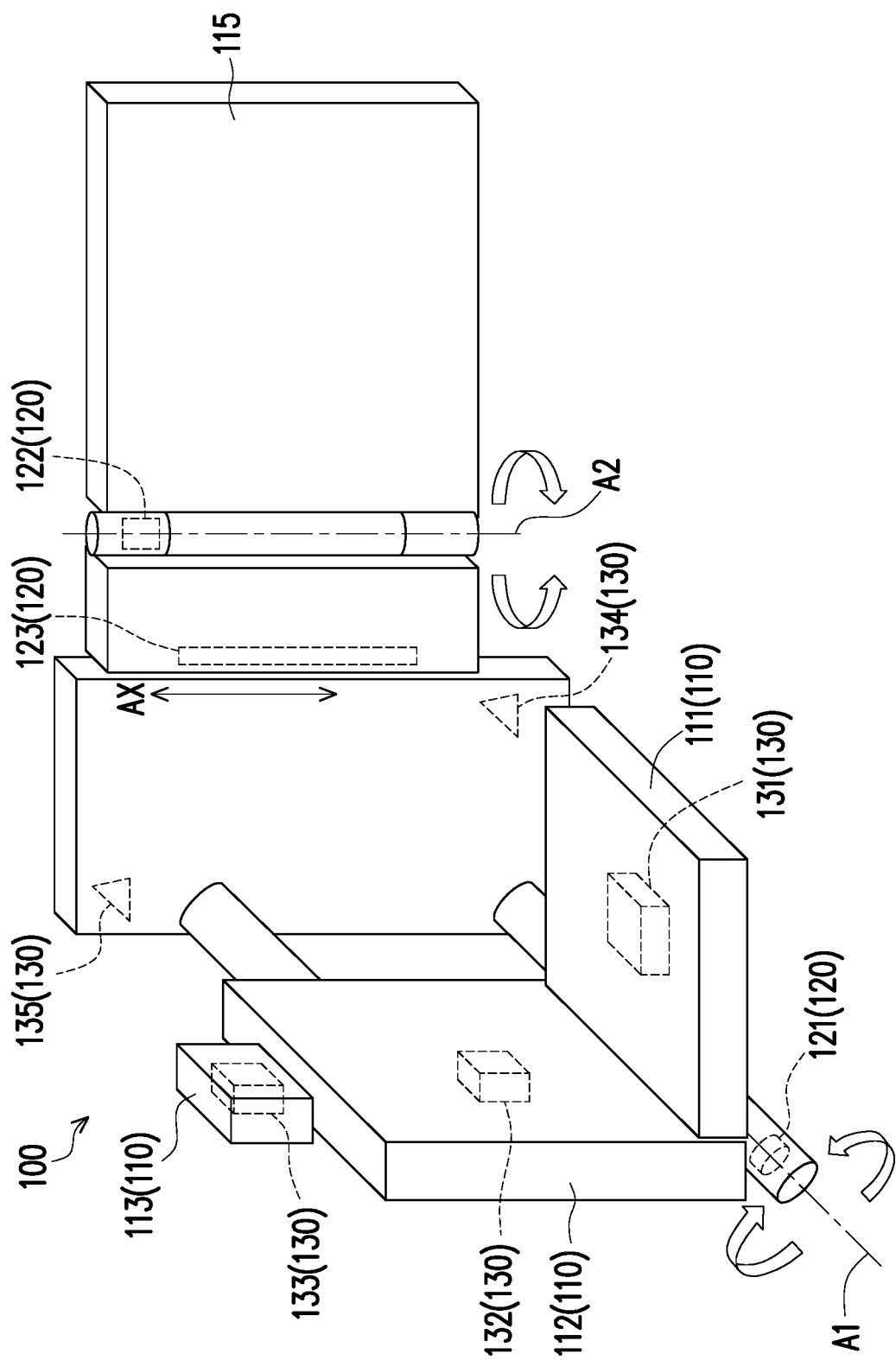
FIG. 1 is a schematic diagram of a computer cockpit according to an embodiment of the invention.
Figure 2:
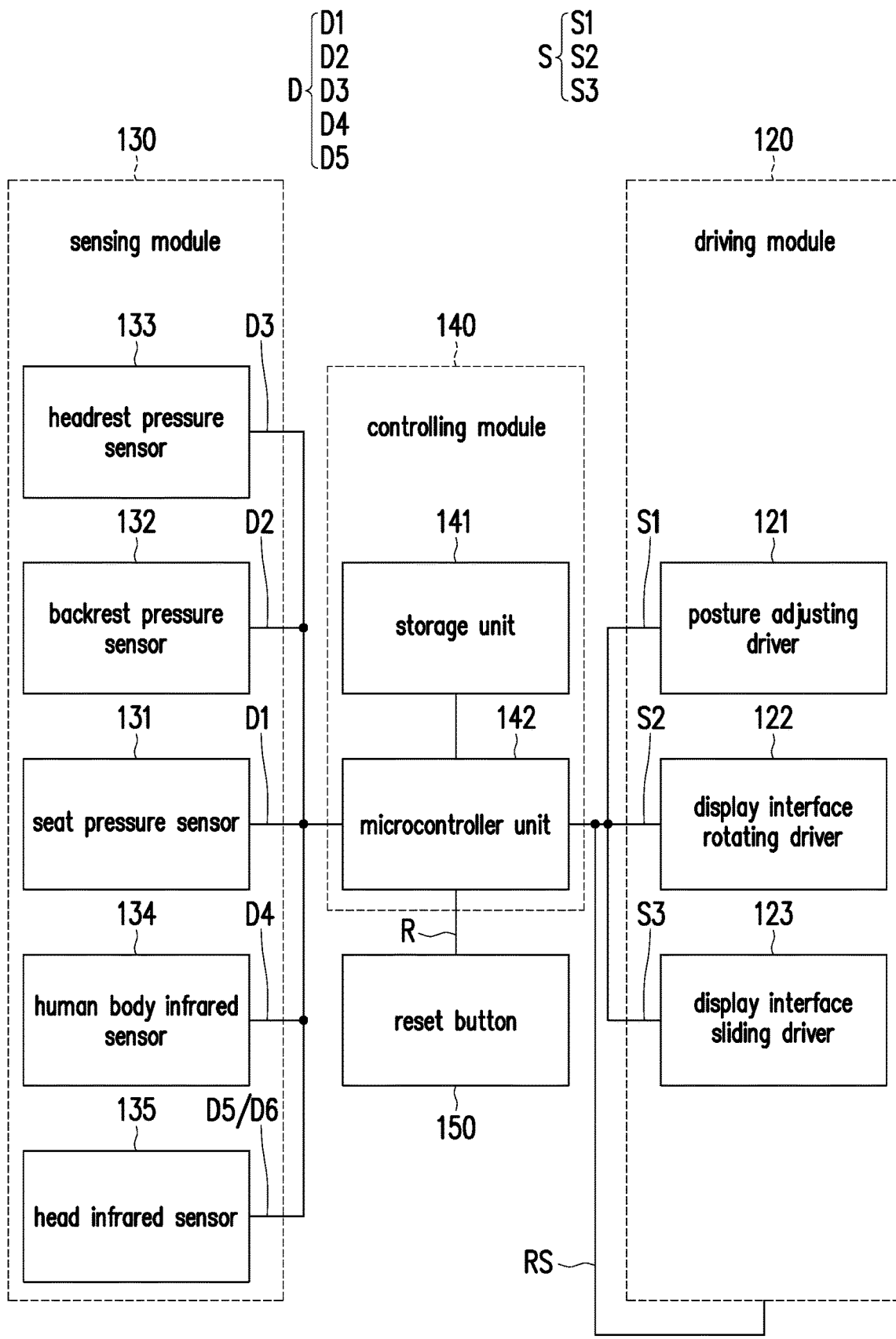
FIG. 2 is a circuit block diagram of the computer cockpit of FIG. 1.

FIG. 1 is a schematic diagram of a computer cockpit according to an embodiment of the invention. FIG. 2 is a circuit block diagram of the computer cockpit of FIG. 1. Referring to FIG. 1 and FIG. 2, the computer cockpit 100 of the embodiment includes a cockpit body 110, a driving module 120, a sensing module 130 and a controlling module 140. The cockpit body 110 includes a seat 111, a backrest 112 and a display interface 115. The seat 111, the backrest 112 and the display interface 115 are movably disposed on the cockpit body 110. The display interface 115 and the backrest 112 are respectively located at two opposite sides of the seat 111 (i.e. the display interface 115 is located in front of the seat 111, and the backrest 112 is located behind the seat 111). The driving module 120 and the sensing module 130 are all disposed to the cockpit body 110. The sensing module 130 is configured to provide a sensing data D. The sensing data D may include a seat pressure sensing value D1 and a backrest pressure sensing value D2. The controlling module 140 is electrically connected to the driving module 120 and the sensing module 130, and is configured to send an adjusting command S according to the sensing data D. The driving module 120 is configured to receive the adjusting command S to synchronously rotate the seat 111, the backrest 112 and the display interface 115 to a working angle $\theta 2$ and reduce a difference between the backrest pressure sensing value D2 and the seat pressure sensing value D1. For example, the difference between the backrest pressure sensing value D2 and the seat pressure sensing value D1 may be decreased to approach zero. Therefore, the computer cockpit 100 of the embodiment is adapted to automatically adjusting reclining angles of the seat 111, the backrest 112 and the display interface 115 to meet with ergonomics, which avails improving comfortness of a user using the computer cockpit 100.

FIG. 3A and FIG. 3B illustrate an operation principle of the computer cockpit of FIG. 1. Referring to FIG. 1, FIG. 3A and FIG. 3B, the backrest 112 and the display interface 115 of the embodiment may have an initial angle $\theta 1$ relative to the seat 111. Certainly, the backrest 112 and the display interface 115 may also do not have the initial angle $\theta 1$ (or the initial angle $\theta 1$ is equal to 0). The seat 111 and the backrest 112 are pivotally connected to the cockpit body 110 by an axis A1, and may be driven by a posture adjusting driver 121 of the driving module 120. The display interface 115 includes (but is not limited to) a display interface displayed by a display screen of a display.

As shown in FIG. 3A, when the user sit on the seat 111 and leans against the backrest 112, the seat 111 is subjected to a first pressure W1, the backrest 112 is subjected to a second pressure W2. A first horizontal distance L1 exists between a force acting position of the first pressure W1 and the axis A1. A second horizontal distance L2 exists between a force acting position of the second pressure W2 and the axis A1.

As shown in FIG. 3B, when the seat 111, the backrest 112 and the display interface 115 are in the working angle $\theta 2$, the first pressure W1 and the second pressure W2 on the seat 111 and the backrest 112 are balanced to meet with a following equation: $W2 \sin(\theta 1+\theta 2)L2=W1 \cos(\theta 2)L1$. Therefore, since the first pressure W1 and the second pressure W2 are balanced with each other, the user does not feel uncomfortable, which avails improving the comfortness of the user using the computer cockpit 100.

Referring to FIG. 2, in the embodiment, the controlling module 140 includes a storing unit 141 and a Microcontroller Unit (MCU) 142. The storing unit 141 is configured to store a compared table. The MCU 142 is electrically connected to the driving module 120, the sensing module 130 and the storing unit 141, and the MCU 142 is configured to send the adjusting command S according to the sensing data D and the compared table.

In an embodiment of the invention, the compared table includes the difference and the working angle $\theta 2$ corresponding to the difference. The MCU 142 may find the difference (for example, between 0 and 5) of a target, and correspondingly adjust the seat 111, the backrest 112 and the display interface 115 to the working angle $\theta 2$. Moreover, the MCU 142 is configured to allow the difference to be within a specific range. A reason thereof is that if the difference is set to 0, the MCU 142 adjusts the working angle $\theta 2$ of the computer cockpit 100 only due to extremely small sway of the user, and such repeated fine-tuning will make the user feeling uncomfortable.

In an embodiment of the invention, the compared table includes the difference, the initial angle $\theta 1$ and the working angle $\theta 2$ corresponding to the difference and the initial angle $\theta 1$. The MCU 142 may find the difference (for example, between 0 and 5) of the target, and correspondingly adjust the seat 111, the backrest 112 and the display interface 115 to the working angle $\theta 2$ according to the initial angle $\theta 1$ of the backrest 112 and the display interface 115.

Referring to FIG. 1 and FIG. 2, in the embodiment, the cockpit body 110 further includes a headrest 113 connected to the backrest 112. The sensing module 130 is configured to provide the sensing data D. The sensing data D further includes a headrest pressure sensing value D3 and a human body position sensing value D4. The sensing module 130 includes a seat pressure sensor 131 a backrest pressure sensor 132, a headrest pressure sensor 133, a human body infrared sensor 134 and a head infrared sensor 135.

In the embodiment, the seat pressure sensor 131 is disposed to the seat 111 and electrically connected to the MCU 142 of the controlling module 140, and is configured to sense a pressure exerted on the seat 111 and correspondingly generate the seat pressure sensing value D1. The backrest pressure sensor 132 is disposed to the backrest 112 and electrically connected to the MCU 142 of the controlling module 140, and is configured to sense a pressure exerted on the backrest 112 and correspondingly generate the backrest pressure sensing value D2. The headrest pressure sensor 133 is disposed to the headrest 113 and electrically connected to the MCU 142 of the controlling module 140, and is configured to sense a pressure exerted on the headrest 113 and correspondingly generate the headrest pressure sensing value D3.

In the embodiment, the sensing data D further includes a head position sensing value D5 and/or an eye position sensing value D6. The human body infrared sensor 134 is disposed to the cockpit body 110 and electrically connected to the MCU 142 of the controlling module 140, and is configured to sense whether the user sits on the seat 111 and correspondingly generate the human body position sensing value D4. The head infrared sensor 135 is disposed to the cockpit body 110 and electrically connected to the controlling module 140, and is configured to sense whether the head of the user is located in front of the headrest 113 and correspondingly generate the head position sensing value D5, and/or configured to sense a position of the eyes of the user and correspondingly generate the eye position sensing value D6.

Referring to FIG. 1 and FIG. 2, the display interface 115 of the embodiment is movably disposed on the cockpit body 110. For example, the display interface 115 is rotatably disposed on the cockpit body 110 along an axis A2 for rotating close to or away from the backrest 112, and the display interface 115 is slidably disposed on the cockpit body 110 in an axial direction AX for height adjustment. The adjusting command S includes a working angle adjusting command S1, a display interface rotating command S2 and a display interface sliding command S3. The driving module 120 includes the posture adjusting driver 121, a display interface rotating driver 122 and a display interface sliding driver 123. The posture adjusting driver 121, the display interface rotating driver 122 and the display interface sliding driver 123 include (but are not limited to) motors.

In the embodiment, the posture adjusting driver 121 is disposed to the cockpit body 110, and is coupled to the seat 111 and the backrest 112 and electrically connected to the MCU 142 of the controlling module 140, and is configured to receive the working angle adjusting command S1 to synchronously rotate the seat 111, the backrest 112 and the display interface 115 to the working angle $\theta 2$.

In the embodiment, the display interface rotating driver 122 is disposed to the cockpit body 110, and is coupled to the display interface 115 and electrically connected to the MCU 142 of the controlling module, and is configured to receive the display interface rotating command S2 to rotate the display interface 115 to face the backrest 112 and the user. The display interface sliding driver 123 is disposed to the cockpit body 110, and is coupled to the display interface 115 and electrically connected to the MCU 142 of the controlling module 140, and is configured to receive the display interface sliding command S3 to adjust a height of the display interface 115. For example, after the height of the display interface 115 is adjusted, a sight line SI of the user horizontally falls at two-thirds of the height of the display interface 115.

Referring to FIG. 1 and FIG. 2, the computer cockpit 100 of the embodiment further includes a reset button 150, which is electrically connected to the MCU 142 of the controlling module 140, and is configured to provide a reset signal R. The MCU 142 of the controlling module 140 is configured to receive the reset signal R and send a reset command RS.

The driving module 120 is configured to receive the reset command RS to drive the cockpit body 110 to restore a predetermined state.

Figure 4:
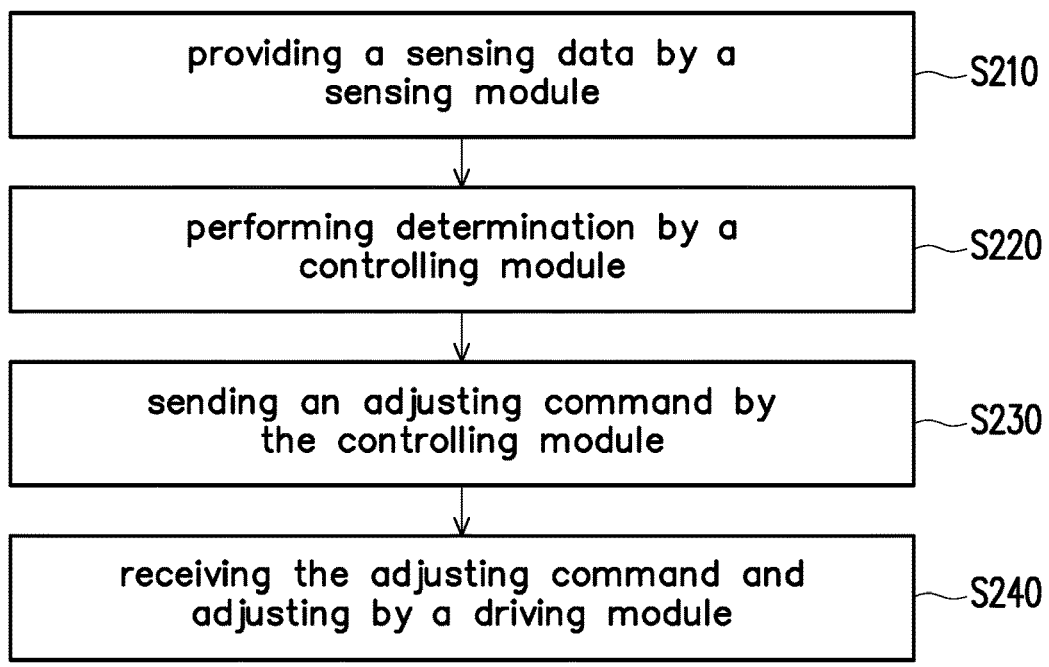
FIG. 4 is a flowchart illustrating a computer cockpit adjusting method according to an embodiment of the invention.

The configuration of the computer cockpit 100 of the embodiment has been described as above. A computer cockpit adjusting method of the embodiment is described below. FIG. 4 is a flowchart illustrating the computer cockpit adjusting method according to an embodiment of the invention. Referring to FIG. 1, FIG. 2 and FIG. 4, the computer cockpit adjusting method of the embodiment includes following steps. In a step S210, the sensing module 130 provides the sensing data D, where the sensing data D includes the seat pressure sensing value D1 and the backrest pressure sensing value D2. In a step S220, the controlling module 140 determines whether the sensing data D exceeds a predetermined value. In a step S230, the controlling module 140 sends an adjusting command S, where when the controlling module 140 determines that the sensing data D exceeds the predetermined value, the controlling module 140 sends the adjusting command S. In a step S240, the driving module 120 receives the adjusting command S to synchronously rotate the seat 111, the backrest 112 and the display interface 115 to the working angle θ2 from a default angle.

Figure 5:
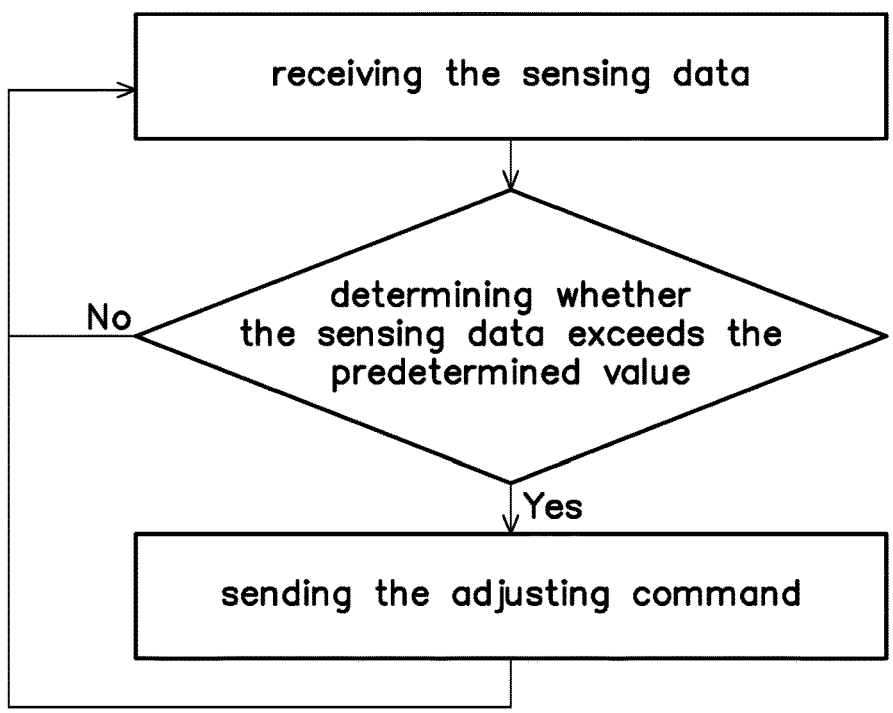
FIG. 5 is a flowchart illustrating a computer cockpit adjusting method according to an embodiment of the invention.

FIG. 5 is a flowchart illustrating a computer cockpit adjusting method according to an embodiment of the invention. With further referring to FIG. 5, in the computer cockpit adjusting method of the invention, the step of performing determination by the MCU 142 of the controlling module 140 includes receiving the sensing data D. Then, the MCU 142 of the controlling module 140 further determines whether the sensing data D exceeds the predetermined value. Finally, after the MCU 142 of the controlling module 140 determines that the sensing data D exceeds the predetermined value, the MCU 142 sends the adjusting command S.

In an embodiment of the invention, the step of providing the sensing data by the sensing module 130 (the step S210) includes: sensing a pressure exerted on the seat 111 by the seat pressure sensor 131 and correspondingly generating the seat pressure sensing value D1; and sensing a pressure exerted on the backrest 112 by the backrest pressure sensor 132 and correspondingly generating the backrest pressure sensing value D2. The step of performing determination by the controlling module 140 (the step S220) includes: determining whether the seat pressure sensing value D1 and the backrest pressure sensing value D2 in the sensing data D exceed the predetermined value. Namely, since the pressures are generated only when the user sits on the seat 111 and leans against the backrest 112, by using the controlling module 140 to determine whether the seat pressure sensing value D1 and the backrest pressure sensing value D2 exceed the predetermined value, it is indirectly learned whether the user sits on the seat 111 and leans against the backrest 112 (i.e. whether the user is seated), and after the user is seated, the seat 111, the backrest 112 and the display interface 115 are adjusted to the working angle.

Referring to FIG. 1, FIG. 2, FIG. 4 and FIG. 5, in an embodiment of the invention, the step of providing the sensing data D by the sensing module 130 (the step S210) further includes: using the headrest pressure sensor 133 to sense a pressure exerted on the headrest 113 of the cockpit body 110 and correspondingly generating the headrest pressure sensing value D3. The step of performing determination by the controlling module 140 (the step S220) includes: determining whether the seat pressure sensing value D1, the backrest pressure sensing value D2 and the headrest pressure sensing value D3 in the sensing data D exceed the predetermined value. Namely, since the pressures are generated only when the user sits on the seat 111 and leans against the backrest 112 and the headrest 113, by using the controlling module 140 to determine whether the seat pressure sensing value D1, the backrest pressure sensing value D2 and the headrest pressure sensing value D3 exceed the predetermined value, it is indirectly learned whether the user sits on the seat 111 and leans against the backrest 112 and the headrest 113 (i.e. whether the user is seated), and after the user is seated, the seat 111, the backrest 112 and the display interface 115 are adjusted to the working angle.

In an embodiment of the invention, the step of providing the sensing data D by the sensing module 130 (the step S210) further includes: using the human body infrared sensor 134 to sense whether the user sits on the seat 111 and correspondingly generating the human body position sensing value D4; and using a head infrared sensor 135 to sense whether the head of the user is located in front of the headrest 113 and correspondingly generating the heat position sensing value D5. The step of performing determination by the controlling module 140 (the step S220) includes: determining whether the seat pressure sensing value D1, the backrest pressure sensing value D2, the headrest pressure sensing value D3, the human body position sensing value D4 and the head position sensing value D5 in the sensing data D exceed the predetermined value. Namely, since the pressures are generated only when the user sits on the seat 111 and leans against the backrest 112 and the headrest 113, and the human body infrared sensor 134 and the head infrared sensor 135 produce larger values only when the user sits on the seat 111 and the head is located in front of the headrest 113, by using the controlling module 140 to determine whether the seat pressure sensing value D1, the backrest pressure sensing value D2, the headrest pressure sensing value D3, the human body position sensing value D4 and the head position sensing value D5 exceed the predetermined value, it is indirectly learned whether the user sits on the seat 111 and leans against the backrest 112 and the headrest 113 (i.e. whether the user is seated), and after the user is seated, the seat 111, the backrest 112 and the display interface 115 are adjusted to the working angle.

Referring to FIG. 1, FIG. 2, FIG. 4 and FIG. 5, in an embodiment of the invention, the step of performing determination by the controlling module 140 (the step S220) further includes: determining whether the human body position sensing value D4 in the sensing data D exceeds the predetermined value. The step of sending the adjusting command S by the controlling module 140 (the step S230) includes: using the controlling module 140 to send the display interface rotating command S2, where when the controlling module 140 determines that the human body position sensing value D4 in the sensing data D exceeds the predetermined value, the controlling module 140 sends the display interface rotating command S2. The step of receiving the adjusting command S by the driving module 120 (the step S240) includes: using the display interface rotating driver 122 to receive the display interface rotating command S2, so as to drive the display interface 115 to rotate along the axis A2 to face the backrest 112 and the user. In other words, the human body infrared sensor 134 produces a larger value only when the user sits on the seat 111, by using the controlling module 140 to determine whether the human body position sensing value D4 exceeds the predetermined value, it is indirectly learned whether the user sits in the computer cockpit 100 (i.e. whether the user is seated), and after the user is seated, the display interface 115 is adjusted to face the backrest 111 and the user. Therefore, the computer cockpit 100 may provide a larger space for the user to enter and exit, and when the user is seated, the display interface 115 may automatically rotate to face the user, which avails improving convenience of the user using the computer cockpit 100.

In an embodiment of the invention, the step of providing the sensing data D by the sensing module 130 (the step S210) further includes: using the head infrared sensor 135 to sense the position of the eyes of the user and correspondingly generating the eye position sensing value D6. The step of performing determination by the controlling module 140 (the step S220) further includes: determining the height of the eyes of the user according to the eye position sensing value D6 in the sensing data D. The step of sending the adjusting command S by the controlling module 140 (the step S230) includes: using the controlling module 140 to send the display interface sliding command S3, where when the controlling module 140 determines the height of the eyes of the user according to the eye position sensing value D6 in the sensing data D, the controlling module 140 sends the display interface sliding command S3. The step of receiving the adjusting command S by the driving module 120 (the step S240) includes: using the display interface sliding driver 123 to receive the display interface sliding command S3, so as to drive the display interface 115 to slide in the axial direction AX to adjust the height of the display interface 115, and after the height of the display interface 115 is adjusted, the sight line SI of the user horizontally falls at two-thirds of the height of the display interface 115. In this way, after the user is seated, the display interface 115 is automatically adjusted to a proper height to meet with ergonomics, which avails improving comfortness of the user using the computer cockpit 100.

Referring to FIG. 1, FIG. 2, FIG. 4 and FIG. 5, in an embodiment of the invention, the step of performing determination by the controlling module 140 (the step S220) further includes: determining whether there is the reset signal R generated by the reset button 150. The computer cockpit adjusting method further includes: using the controlling module 140 to send the reset command RS, where when the controlling module 140 receives the reset signal R, the controlling module 140 sends the reset command RS; and using the driving module 120 to receive the reset command RS to restore a predetermined position. In this way, when the user wants to leave the computer cockpit 100, the user is only required to press the reset button 150 to restore the predetermined angle of the computer cockpit 100 (i.e. the angle shown in FIG. 3A), and the display interface 115 is rotated to depart from the backrest 112 (i.e. the state shown in FIG. 1), which avails improving the convenience of the user using the computer cockpit 100.

Figure 6A:
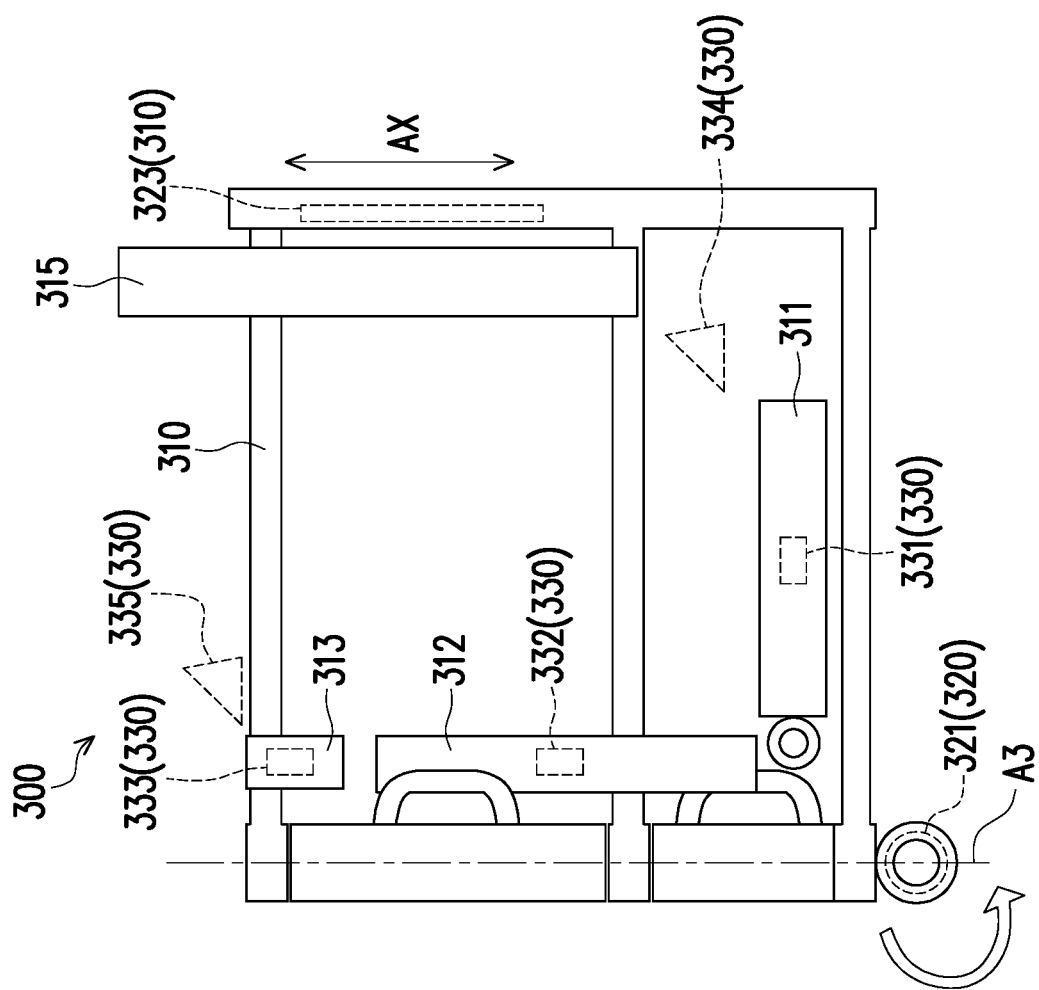
FIG. 6A is a side view of a computer cockpit according to another embodiment of the invention.
Figure 6B:
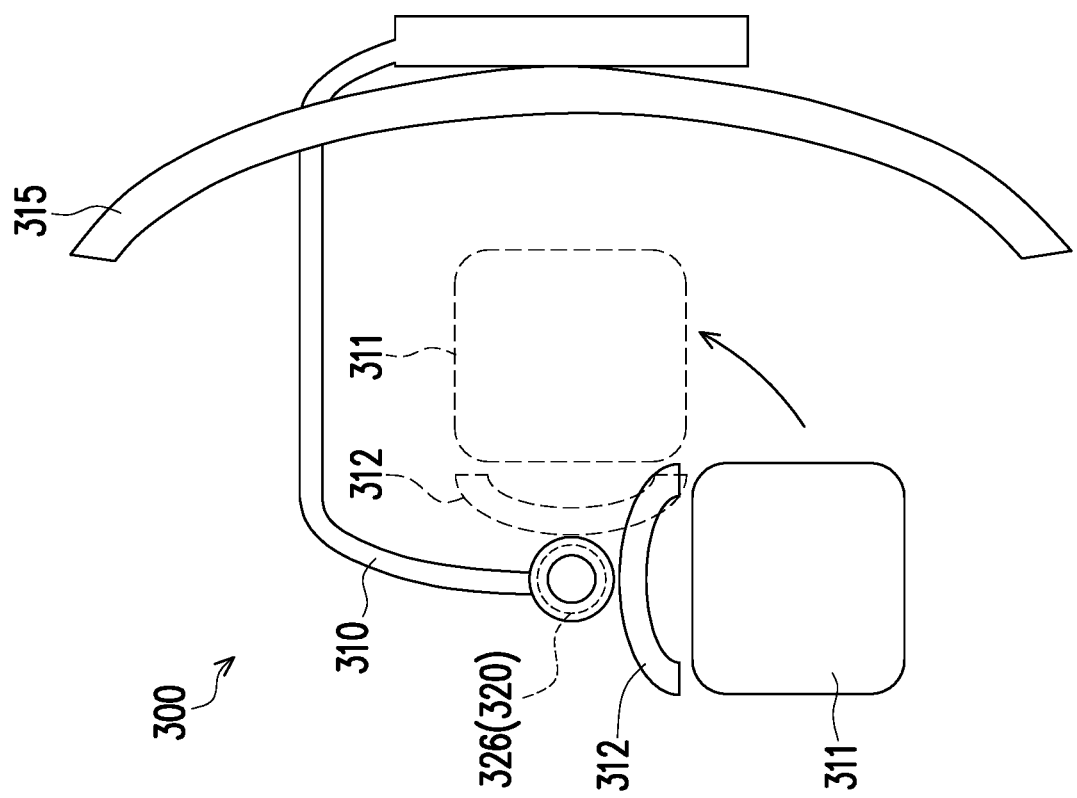
FIG. 6B is a top view of the computer cockpit of FIG. 6A.
Figure 7:
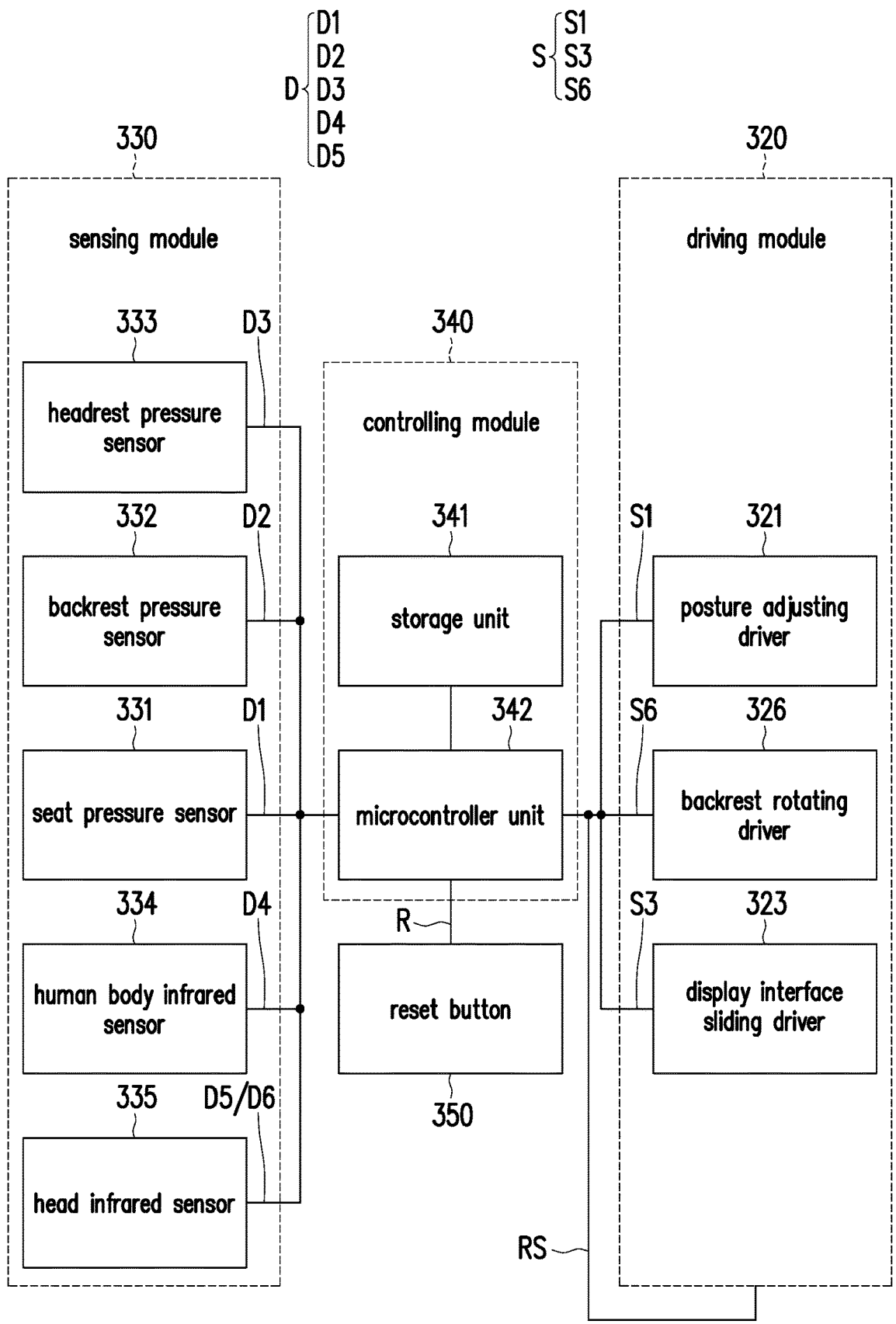
FIG. 7 is a circuit block diagram of the computer cockpit of FIG. 6A.

FIG. 6A is a side view of a computer cockpit according to another embodiment of the invention. FIG. 6B is a top view of the computer cockpit of FIG. 6A. FIG. 7 is a circuit block diagram of the computer cockpit of FIG. 6A. In the computer cockpit 300 of the embodiment of FIG. 6A, FIG. 6B and FIG. 7, configurations and functions of a cockpit body 310, a seat 311, a headrest 313, a posture adjusting driver 321, a display interface sliding driver 323, a sensing module 330, a seat pressure sensor 331, a backrest pressure sensor 332, a headrest pressure sensor 333, a human body infrared sensor 334, a head infrared sensor 335, a controlling module 340, a storing unit 341, a MCU 342 and a reset button 350 are similar to the configurations and functions of the cockpit body 110, the seat 111, the headrest 113, the posture adjusting driver 121, the display interface sliding driver 123, the sensing module 130, the seat pressure sensor 131, the backrest pressure sensor 132, the headrest pressure sensor 133, the human body infrared sensor 134, the head infrared sensor 135, the controlling module 140, the storing unit 141, the MCU 142 and the reset button 150 in the computer cockpit 100 of the embodiment of FIG. 1 and FIG. 2, so that details thereof are not repeated.

A difference between the embodiment of FIG. 6A, FIG. 6B and FIG. 7 and the embodiment of FIG. 1 and FIG. 2 is that the backrest 312 of the embodiment may be rotatably disposed on the cockpit body 110, and the adjusting command S includes a backrest rotating command S6. The driving module 320 includes a backrest rotating driver 326 disposed to the cockpit body 310, which is coupled to the backrest 312 and electrically connected to the controlling module 340. The backrest rotating driver 326 includes (but is not limited to) a motor, and is configured to receive the backrest rotating command S6 to rotate the backrest 312 and the seat 311 to face the display interface 315. Therefore, the computer cockpit 300 may provide a larger space for the user to enter and exit, and when the user is seated, the backrest 312 and the seat 311 may automatically rotate to face the user, which avails improving convenience of the user using the computer cockpit 300.

Moreover, in the embodiment, since the computer cockpit 300 adopts a manner of automatically adjusting the backrest 312 to face the display interface 315, the display interface 315 that is unnecessary to be rotated may be a curved surface display with a wider size. Therefore, the computer cockpit 300 of the embodiment may further improve visual enjoyment of the user.

Figure 8:
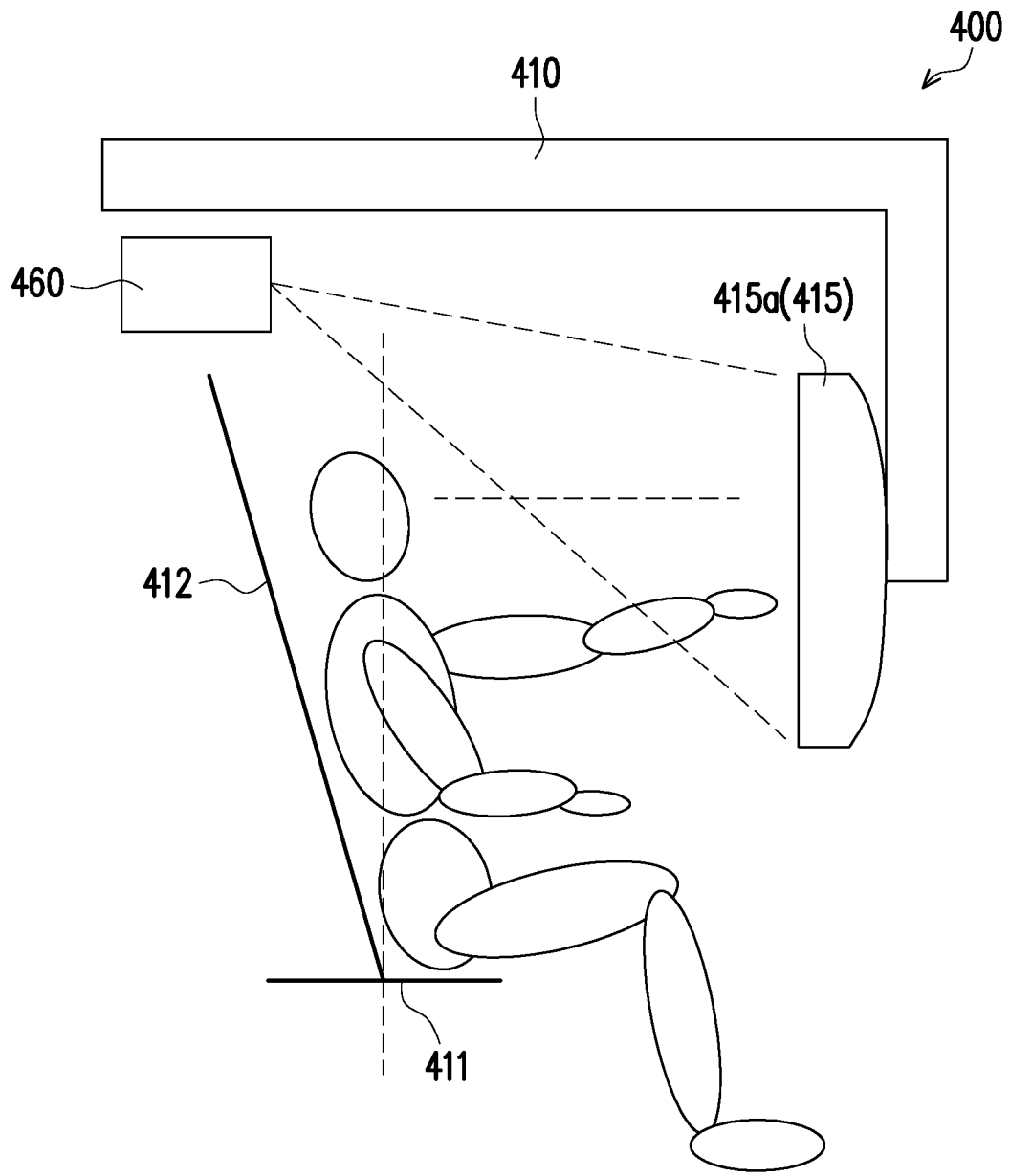
FIG. 8 is a schematic diagram of a computer cockpit according to still another embodiment of the invention.

FIG. 8 is a schematic diagram of a computer cockpit according to still another embodiment of the invention. Referring to FIG. 8, in the computer cockpit 400 of the embodiment of FIG. 8, configurations and functions of a cockpit body 410, a seat 411 and a backrest 412 are similar to the configurations and functions of the cockpit body 110, the seat 111 and the backrest 112 in the computer cockpit 100 of the embodiment of FIG. 1, so that details thereof are not repeated. Differences between the embodiment of FIG. 8 and the embodiment of FIG. 1 are that the display interface 415 of the embodiment includes a projecting screen 415a, and the computer cockpit 400 further includes a projector 460 disposed on the top of the cockpit body 410, and the projecting screen 415a and the projector 460 are respectively located at two opposite sides of the seat 411. Therefore, since the projecting screen 415a may provide an image of a larger size, the computer cockpit 400 of the embodiment may improve the visual enjoyment of the user.

In summary, in the computer cockpit and the adjusting method thereof of the invention, the sensing module is disposed to the cockpit body, and is configured to provide the sensing data. The sensing data include the seat pressure sensing value and the backrest pressure sensing value. The controlling module is electrically connected to the driving module and the sensing module, and is configured to send the adjusting command according to the sensing data. The driving module is configured to receive the adjusting command to rotate the seat, the backrest and the display interface to the working angle and reduce the difference between the backrest pressure sensing value and the seat pressure sensing value. In this way, the angles of the seat, the backrest and the display interface may be automatically adjusted to meet ergonomics, which avails improving comfortness of the user using the computer cockpit.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A computer cockpit, comprising:
    a body, comprising a seat, a backrest and a display interface, the seat, the backrest and the display interface being movably disposed on the body, and the display interface and the backrest being respectively located at two opposite sides of the seat;
    a driving module, disposed to the body;
    a sensing module, disposed to the body, and configured to provide sensing data, wherein the sensing data comprises a seat pressure sensing value and a backrest pressure sensing value; and
    a controlling module, electrically connected to the driving module and the sensing module, and configured to send an adjusting command according to the sensing data,
    wherein the driving module is configured to receive the adjusting command to synchronously rotate the seat, the backrest and the display interface to a working angle and reduce a difference between the backrest pressure sensing value and the seat pressure sensing value, wherein the seat and the backrest are pivotally connected to the body by an axis, and when the seat, the backrest and the display interface are in the working angle, a following equation is satisfied:

$$W2 \sin(\theta 1+\theta 2)L2 = W1 \cos(\theta 2)L1$$

wherein W1 is a first pressure exerted to the seat,
W2 is a second pressure exerted to the backrest,
θ1 is an initial angle of the backrest and the display interface relative to the seat,
θ2 is the working angle,
L1 is a first horizontal distance between a force acting position of the first pressure and the axis, and
L2 is a second horizontal distance between a force acting position of the second pressure and the axis.

2. The computer cockpit as claimed in claim 1, wherein the sensing module comprises:
    a seat pressure sensor, disposed to the seat and electrically connected to the controlling module, and configured to sense a pressure exerted on the seat and correspondingly generate the seat pressure sensing value.

3. The computer cockpit as claimed in claim 2, wherein the body further comprises a headrest connected to the backrest, the sensing data further comprises a headrest pressure sensing value, the sensing module comprises:
    a backrest pressure sensor, disposed to the backrest and electrically connected to the controlling module, and configured to sense a pressure exerted on the backrest and correspondingly generate the backrest pressure sensing value; and
    a headrest pressure sensor, disposed to the headrest and electrically connected to the controlling module, and configured to sense a pressure exerted on the headrest and correspondingly generate the headrest pressure sensing value.

4. The computer cockpit as claimed in claim 3, wherein the sensing data further comprises a human body position sensing value, a head position sensing value and/or an eye position sensing value, the sensing module comprises:
    a human body infrared sensor, disposed to the body and electrically connected to the controlling module, and configured to sense whether a user sits on the seat and correspondingly generate the human body position sensing value; and
    a head infrared sensor, disposed to the body and electrically connected to the controlling module, and configured to sense whether a head of a user is located ill front of the headrest and correspondingly generate the head position sensing value, and/or configured to sense a position of eyes of the user and correspondingly generate the eye position sensing value.

5. The computer cockpit as claimed in claim 4, wherein the adjusting command comprises a working angle adjusting command, and the driving module comprises:
    a posture adjusting driver, disposed to the body, and coupled to the seat and the backrest and electrically connected to the controlling module, and configured to receive the working angle adjusting command to synchronously rotate the seat, the backrest and the display interface to the working angle.

6. The computer cockpit as claimed in claim 4, wherein the display interface is rotatably disposed on the body, the adjusting command comprises a display interface rotating command, and the driving module comprises:
    a display interface rotating driver, disposed to the body, coupled to the display interface and electrically connected to the controlling module, and configured to receive the display interface rotating command to rotate the display interface to face the backrest.

7. The computer cockpit as claimed in claim 4, wherein the display interface is slidably disposed on the body, the adjusting command comprises a display interface sliding command, and the driving module comprises:
    a display interface sliding driver, disposed to the body, coupled to the display interface and electrically connected to the controlling module, and configured to receive the display interface sliding command to adjust a height of the display interface.

8. The computer cockpit as claimed in claim 1, wherein the sensing module comprises:
    a backrest pressure sensor, disposed to the backrest and electrically connected to the controlling module, and configured to sense a pressure exerted on the backrest and correspondingly generate the backrest pressure sensing value.

9. The computer cockpit as claimed in claim 1, wherein the body further comprises a headrest connected to the backrest, the sensing data further comprises a headrest pressure sensing value, and the sensing module comprises:
    a headrest pressure sensor, disposed to the headrest and electrically connected to the controlling module, and configured to sense a pressure exerted on the headrest and correspondingly generate the headrest pressure sensing value.

10. The computer cockpit as claimed in claim 1, wherein the sensing data further comprises a human body position sensing value, the sensing module comprises:
    a human body infrared sensor, disposed to the body and electrically connected to the controlling module, and configured to sense whether a user sits on the seat and correspondingly generate the human body position sensing value.

11. The computer cockpit as claimed in claim 1, wherein the body further comprises a headrest connected to the backrest, the sensing data further comprises a head position sensing value and/or an eye position sensing value, and the sensing module comprises:

a head infrared sensor, disposed to the body and electrically connected to the controlling module, and configured to sense whether a head of a user is located in front of the headrest and correspondingly generate the head position sensing value, and/or configured to sense a position of eyes of the user and correspondingly generate the eye position sensing value.

12. The computer cockpit as claimed in claim 1, wherein the adjusting command comprises a working angle adjusting command, and the driving module comprises:
a posture adjusting driver, disposed to the body, and coupled to the seat and the backrest and electrically connected to the controlling module, and configured to receive the working angle adjusting command to synchronously rotate the seat, the backrest and the display interface to the working angle.

13. The computer cockpit as claimed in claim 1, wherein the controlling module comprises:
a storing unit, configured to store a compared table; and
a microcontroller unit, electrically connected to the driving module, the sensing module and the storing unit, and configured to send the adjusting command according to the sensing data and the compared table.

14. The computer cockpit as claimed in claim 13, wherein the backrest and the display interface are rotatably connected to the seat, and the backrest and the display interface have an initial angle relative to the seat, and the compared table comprises the difference, the initial angle and the working angle corresponding to the difference and the initial angle.

15. The computer cockpit as claimed in claim 1, wherein the display interface is rotatably disposed on the body, the adjusting command comprises a display interface rotating command, and the driving module comprises:
a display interface rotating driver, disposed to the body, coupled to the display interface and electrically connected to the controlling module, and configured to receive the display interface rotating command to rotate the display interface to face the backrest.

16. The computer cockpit as claimed in claim 1, wherein the display interface is slidably disposed on the body, the adjusting command comprises a display interface sliding command, and the driving module comprises:
a display interface sliding driver, disposed to the body, coupled to the display interface and electrically connected to the controlling module, and configured to receive the display interface sliding command to adjust a height of the display interface.

17. The computer cockpit as claimed in claim 1, wherein the backrest is rotatably disposed on the body, the adjusting command comprises a backrest rotating command, and the driving module comprises:
a backrest rotating driver, disposed to the body, coupled to the backrest and electrically connected to the controlling module, and configured to receive the backrest rotating command to rotate the backrest and the seat to face the display interface.

18. The computer cockpit as claimed in claim 1, wherein the display interface comprises a projecting screen, and the computer cockpit further comprises:
a projector, disposed on top of the body, and the projecting screen and the projector being respectively located at the two opposite sides of the seat.

19. A computer cockpit adjusting method, for adjusting the computer cockpit as claimed in claim 1, the computer cockpit adjusting method comprising:
providing the sensing data by the sensing module, wherein the sensing data comprises the seat pressure sensing value and the backrest pressure sensing value;
determining whether the sensing data exceeds a predetermined value by the controlling module;
sending the adjusting command by the controlling module, wherein when the controlling module determines that the sensing data exceeds the predetermined value, the controlling module sends the adjusting command; and
receiving the adjusting command by the driving module to synchronously rotate the seat, the backrest and the display interface to the working angle from a default angle.

* * * * *